UNITED STATES PATENT OFFICE.

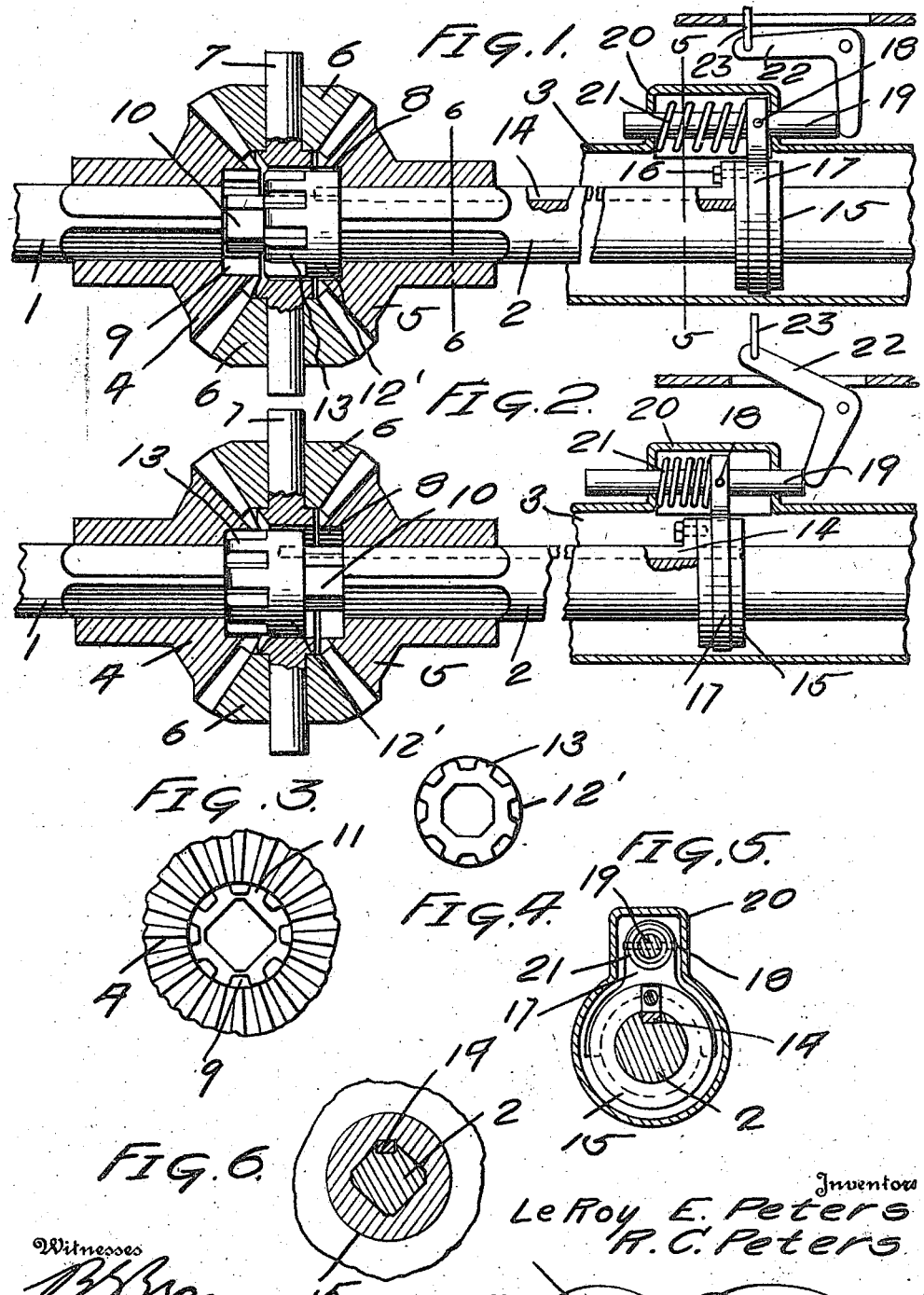

LE ROY E. PETERS AND RAYMOND C. PETERS, OF CHICAGO, ILLINOIS.

DIFFERENTIAL-GEAR LOCK.

1,170,561.  Specification of Letters Patent.  Patented Feb. 8, 1916.

Application filed February 8, 1915. Serial No. 6,906.

*To all whom it may concern:*

Be it known that we, LE ROY E. PETERS and RAYMOND C. PETERS, citizens of the United States, residing at Chicago, in the county of Cook, State of Illinois, have invented certain new and useful Improvements in Differential-Gear Locks; and we do hereby declare the following to be a full, clear, and exact description of the invention, such as will enable others skilled in the art to which it appertains to make and use the same.

This invention relates to a differential gear lock.

An object of the invention resides in the provision of a device of this character by means of which the two parts of the rear axle may be locked together.

With this and other objects in view, such as will appear as the description progresses, our invention comprises the combination and arrangement of parts as set forth in and falling within the scope of the appended claims.

Referring to the drawing: Figure 1 is a sectional view showing the gears and the manner in which our device is applied thereto, the clutching member being disengaged so as to allow the portions of the rear axles to rotate independently. Fig. 2 is a longitudinal sectional view showing the clutch in engagement. Fig. 3 is an elevational view of the gear in which the clutch member is formed. Fig. 4 is an end elevation of the clutch member. Fig. 5 is a section on line 5—5 of Fig. 1, showing the manner of mounting the operating rod in one axle portion. Fig. 6 is a section on lnne 6—6 of Fig. 1, showing the mounting of the shipper member.

Referring to the drawing wherein like parts are indicated by like characters throughout the several views: The two portions of the drive axle are indicated by the reference characters 1 and 2 which extend into a suitable gear casing 3 having gears 4 and 5 mounted, respectively, on the squared ends thereof. These gears are arranged to face each other in the usual manner and intermesh with the beveled gears 6 which are mounted on stud shafts 7 which are fixedly mounted in the casing 3. The gear 5 is provided with a chamber 8 which is arranged in the face thereof adjacent the gear 4. The portion 2 of the axle extends through the gear 5 and into a chamber 9 in the face of the gear 4. The extending end 10 of this portion 2 of the axle is of octagonal formation. The chamber 9 is substantially of circular formation and is provided with a plurality of teeth 11 extending around the circular face of the same.

In order that the gears 4 and 5 may be clutched together we have mounted a clutch member 12, slidably, on the octagonal end 10 of the portion 2 of the axle. This clutch member is of substantially cylindrical formation and has a plain portion 12′ and a toothed portion 13, the teeth of which are arranged to engage the teeth 11 in the chamber 9. The ends of the teeth on the portion 13 of the clutch member are rounded to facilitate their entry between the teeth 11. The plain portion 12 of the clutch member is normally located within the chamber 8 in the gear 5 and the toothed portion 13 is located in the space between the gears 4 and 5 when the axle portions are free to rotate independently. This clutch member may be moved, however, on the octagonal portion 10 of the portion 2 of the axle so that the teeth on the clutch member engage t.ie teeth in the chamber 9 and consequently the portions 1 and 2 of the axle will be locked together. In order that this clutch member may be shifted back and forth we have provided the axle portion 2 with a longitudinally extending groove in which is slidably mounted a rod 14 which extends through a similar cut-out portion of the gear 5 and is connected to the clutch member. Secured to the axle portion 2 within the casing 3 is a channeled collar 15 to which the rod 14 is secured by a screw or other suitable means 16.

A shipper member 17 straddles the collar 15 and has its legs located in the channel therein. This shipper member is secured, as at 18, to a sliding rod 19 mounted in an offset portion 20 of the casing 3. Encircling this rod is a coil spring 21 which bears against the end of the shipper member 17 and the opposite end of the casing to normally maintain the teeth on the clutch member out of engagement with the teeth in the chamber 9 of the gear 4. In order that the rod 19 may be operated against the tension of the spring 21 to cause the engagement of the clutch member and the gear 4 we have provided a bell crank lever 22, which has a flexible member 23 connected thereto, which member is connected to a suitable pedal within the reach of the operator.

From the foregoing description it will be readily seen that we have provided a gear lock by means of which the differential gears may be locked together at the will of the operator and we have further provided means for manually controlling said locking portion and automatic means for disengaging the clutch from the clutch member in the adjacent gear upon the release of the operating means.

While we have illustrated and described a particular embodiment of our invention, we have merely done so for the sake of convenience and we do not wish to be limited to that particular embodiment as it is obvious that numerous changes may be made within the details of construction thereof vithout in any way departing from the spirit of the invention or exceeding the scope of the appended claims.

What we claim is:—

1. The combination with a two part driven axle having its ends terminating in spaced relation, of a differential gear secured to the end of each portion of the axle, one of said gears having a chamber therein provided with a plurality of teeth around the face thereof, a clutch member slidably mounted on the end of the opposing portion of the axle and rotatable therewith, said clutch member having a plurality of teeth thereon arranged to engage the teeth of the clutch member, a rod secured to the clutch member and extending through a channel in the adjacent gear and portion of the axle, a collar secured to the said axle portion and to the said rod, and means for moving the collar to shift the clutch member into engagement with the teeth in the said chamber.

2. The combination with a two part axle having the ends thereof in spaced relation, of gears secured to the said ends, gears extending between and meshing with the first mentioned gears on opposite sides thereof, one of said gears having a clutch chamber therein, a clutch member slidably mounted on the end of the opposing portion of the axle, a collar secured to the said axle portion, a rod connecting the collar and the clutch member, a shipper member straddling the said collar, a casing, a rod slidably mounted in said casing, means for securing the shipper member to the said rod and resilient means for moving the shipper member to disengage the clutch member from the aforementioned clutch chamber.

In testimony whereof, we affix our signatures, in the presence of two witnesses.

LE ROY E. PETERS.
RAYMOND C. PETERS.

Witnesses:
D. A. PETERS,
DAVID W. HUFFMAN.

Copies of this patent may be obtained for five cents each, by addressing the "Commissioner of Patents, Washington, D. C."